(12) United States Patent
Toyoda et al.

(10) Patent No.: US 9,169,411 B2
(45) Date of Patent: *Oct. 27, 2015

(54) RECORDING MATERIAL

(71) Applicant: SEIKO EPSON CORPORATION, Tokyo (JP)

(72) Inventors: Naoyuki Toyoda, Nagano (JP); Masaya Shibatani, Nagano (JP); Minoru Yamada, Nagano (JP); Tomohiro Ogawa, Nagano (JP); Hidekazu Moriyama, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/310,459

(22) Filed: Jun. 20, 2014

(65) Prior Publication Data

US 2014/0302291 A1    Oct. 9, 2014

Related U.S. Application Data

(63) Continuation of application No. 13/738,340, filed on Jan. 10, 2013, now Pat. No. 8,795,819.

(30) Foreign Application Priority Data

Feb. 1, 2012    (JP) ................................. 2012-020356

(51) Int. Cl.
| | |
|---|---|
| *B32B 3/00* | (2006.01) |
| *C09D 11/30* | (2014.01) |
| *C09D 11/38* | (2014.01) |
| *C09D 11/101* | (2014.01) |
| *B41M 7/00* | (2006.01) |
| *C09D 11/322* | (2014.01) |

(52) U.S. Cl.
CPC ............. *C09D 11/30* (2013.01); *B41M 7/0081* (2013.01); *C09D 11/101* (2013.01); *C09D 11/322* (2013.01); *C09D 11/38* (2013.01); *B41M 2205/10* (2013.01); *Y10T 428/24802* (2015.01); *Y10T 428/24893* (2015.01); *Y10T 428/24901* (2015.01)

(58) Field of Classification Search
CPC .... C09D 11/30; C09D 11/311; C09D 11/322; B41M 7/0081; Y10T 428/24802; Y10T 428/893; Y10T 428/901
See application file for complete search history.

(56) References Cited

U.S. PATENT DOCUMENTS

| | | | |
|---|---|---|---|
| 6,340,723 B1 | 1/2002 | Nitta et al. | |
| 6,808,271 B1 | 10/2004 | Kurematsu | |
| 2002/0096087 A1 | 7/2002 | Glausch | |
| 2003/0199655 A1 | 10/2003 | Yurugi et al. | |
| 2004/0214945 A1 | 10/2004 | Uozumi | |

(Continued)

FOREIGN PATENT DOCUMENTS

| | | |
|---|---|---|
| JP | 10-219150 A | 8/1998 |
| JP | 2001-106937 A | 4/2001 |

(Continued)

*Primary Examiner* — Elizabeth Mulvaney
(74) *Attorney, Agent, or Firm* — Global IP Counselors, LLP

(57) ABSTRACT

A recording material includes an ultraviolet-curable composition for inkjet that includes a polymerized compound and a glittering powder to produce the recording material, a recording medium, and a print layer formed on the recording medium. The content rate of the glittering powder in the print layer is more than 0.1 percent by volume and less than 5.0 percent by volume.

13 Claims, 1 Drawing Sheet

(56) References Cited

U.S. PATENT DOCUMENTS

| | | |
|---|---|---|
| 2006/0000389 A1 | 1/2006 | Duguet et al. |
| 2006/0063004 A1 | 3/2006 | Takano et al. |
| 2008/0081124 A1 | 4/2008 | Sano et al. |
| 2008/0081864 A1 | 4/2008 | Takano |
| 2009/0075036 A1 | 3/2009 | Itano et al. |
| 2009/0110827 A1 | 4/2009 | Nakano et al. |
| 2009/0208651 A1 | 8/2009 | Oyanagi et al. |
| 2009/0220695 A1 | 9/2009 | Oyanagi et al. |
| 2009/0280302 A1 | 11/2009 | Rukumoto et al. |
| 2010/0026751 A1 | 2/2010 | Oyanagi |
| 2010/0075119 A1 | 3/2010 | Ohnishi |
| 2010/0279083 A1 | 11/2010 | Trummer et al. |
| 2010/0330296 A1 | 12/2010 | Loccufier et al. |
| 2011/0008613 A1 | 1/2011 | Takano et al. |
| 2011/0014440 A1 | 1/2011 | Itano et al. |
| 2012/0295076 A1 | 11/2012 | Toyoda et al. |
| 2012/0295082 A1 | 11/2012 | Toyoda et al. |

FOREIGN PATENT DOCUMENTS

| | | |
|---|---|---|
| JP | 2001-108937 A | 4/2001 |
| JP | 2001-164150 A | 6/2001 |
| JP | 2001-192618 A | 7/2001 |
| JP | 2002-194247 A | 7/2002 |
| JP | 2006-501345 A | 1/2006 |
| JP | 2006-169393 A | 6/2006 |
| JP | 2008-088228 A | 4/2008 |
| JP | 2009-057548 A | 3/2009 |
| JP | 2009-091550 A | 4/2009 |
| JP | 2009-215411 A | 9/2009 |
| JP | 2010-018730 A | 1/2010 |
| JP | 2010-030139 A | 2/2010 |
| JP | 2010-077228 A | 4/2010 |
| JP | 2010-242037 A | 10/2010 |
| JP | 2011-012253 A | 1/2011 |
| JP | 2011-046115 A | 3/2011 |
| JP | 2011-508030 A | 3/2011 |
| JP | 2011-137083 A | 7/2011 |
| WO | 2005/007755 A1 | 1/2005 |

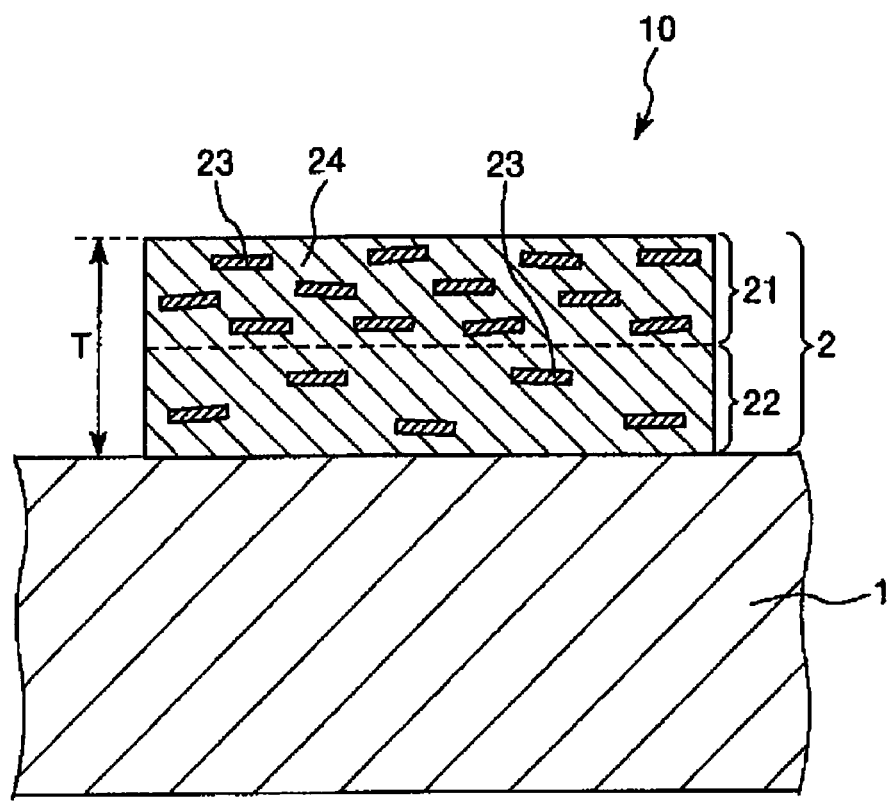

RECORDING MATERIAL

CROSS-REFERENCE TO RELATED APPLICATIONS

This application is a continuation application of U.S. patent application Ser. No. 13/738,340 filed on Jan. 10, 2012. This application claims priority to Japanese Patent Application No. 2012-020356 filed on Feb. 1, 2012. The entire disclosures of U.S. patent application Ser. No. 13/738,340 and Japanese Patent Application No. 2012-020356 are hereby incorporated herein by reference.

BACKGROUND

1. Technical Field

The present invention relates to a recording material.

2. Background Technology

Conventionally, as a production method of a decorative product presenting glossy appearance, a metallic plating, a stamp-printing by using a metallic foil, a thermal transfer by using a metallic foil, or the like have been used. However, in these methods, problems appeared such that it was difficult to form a fine pattern and also, it was difficult to perform an application to a curved surface part. Also, in the stamp-printing, it had a low on-demand characteristic so that it was not appropriate for the high multi-production. In addition, a problem appeared such that a metal kind of gradation cannot be printed.

On the other hand, as a recording method to a recording medium by compositions including pigments or colorants, an inkjet method is used. The inkjet method provides excellent formation of the fine pattern and it is appropriate to perform the application to the curve surface part. Also, in recent years, a composition (ultraviolet-curable composition for inkjet), which becomes hardened when irradiating ultraviolet, has been used in order to provide excellent abrasion resistance, excellent water resistance, excellent solvent resistance, or the like in the inkjet method (see, for example, Japanese Laid-Open Patent Publication No. 2009-57548). However, in the ultraviolet-curable composition for inkjet, when a glittering powder, which is like a metal powder, was used instead of general pigments or colorants, a problem appeared such that the characteristics such as a glossy appearance cannot be sufficiently demonstrated.

SUMMARY

The object of the present invention is to provide a recording material having a pattern (print layer) with excellent glossy appearance and excellent durability.

These objects are achieved by the present invention as discussed below.

The recording material according to one aspect of the invention includes an ultraviolet-curable composition for inkjet that includes a polymerized compound and a glittering powder to produce the recording material, a recording medium, and a print layer formed on the recording medium. The content rate of the glittering powder in the print layer is more than 0.1 percent by volume and less than 5.0 percent by volume.

In the recording material of the present invention, it is preferable that the glittering powder has a scale-like shape. Because of this, the recording material can be provided with a particular excellent glossy appearance and a particular excellent durability. In the recording material of the present invention, the average thickness of the glittering powder is preferably more than 10 nm and less than 100 nm, the average grain diameter is preferably more than 500 nm and less than 3.0 μm, and in addition, the maximum grain diameter is preferably less than 5 μm. Because of this, the recording material can be provided with excellent glossy appearance and excellent high-class appearance.

In the recording material of the invention, a thickness of the print layer is T (μm), and when an area that is thickness 0.5T (μm) from an outer surface in the print layer is a first area and an area that is thickness 0.5T (μm) from a contact surface contacting the recording medium in the print layer is a second area, a ratio of the glittering powder included in the first area of the print layer is more than 70 percent by volume and less than 95 percent by volume, and a ratio of the glittering powder included in the second area of the print layer is more than 5 percent by volume and less than 30 percent by volume.

In the recording material of the present invention, the ultraviolet-curable composition for inkjet in which mother particles constitute A1 on at least vicinity of a surface as the glittering powder includes metal particles treated by a surface preparation with a fluorinated silane compound and/or a fluorinated phosphate ester as a surface preparation agent. Among the various metal materials, A1 originally has excellent glossy appearance, but the present inventors have discovered problems such that when the powder constituting A1 was used for the ultraviolet-curable composition for inkjet, the discharge stability in the ultraviolet-curable composition for inkjet became low, and the glossy appearance of the recording medium produced by using the ultraviolet-curable composition for inkjet was weak compare to the glossy appearance used to be included in the constituent material (A1) of the glittering powder. On the other hand, even when the mother particles constituting A1 on the surface was used, the occurrence of the above problems can be properly prevented when the glittering powder (metal powder) was treated by a fluorinated silane compound and/or fluorinated phosphate ester as a surface preparation agent. That is, in the glittering powder constituting the ultraviolet-curable composition for inkjet, since the powder (mother particles) constituting mainly A1 on at least the surface is treated by a surface preparation with the fluorinated silane compound and/or the fluorinated phosphate ester, the above described effects are particularly demonstrated. The excellent glossy appearance of the recording material, and the excellent storage stability and the excellent discharge stability of the ultraviolet-curable composition for inkjet are respectively secured at the high level.

In the recording material of the present invention, the ultraviolet-curable composition for inkjet preferably includes the metal powder that is treated by the surface preparation with the fluorinated silane compound that has a chemical formula shown in formula (1) below.

$$R^1 SiX^1_a R^2_{(3-a)} \tag{1}$$

(In formula (1), $R^1$ represents a hydrocarbon group in which a part or all of hydrogen atoms is substituted by fluorine atom, $X^1$ represents hydrolysis group, ether group, chloro group or hydroxyl group, $R^2$ represents alkyl group having a carbon number 1 to 4, and a represents an integer between 1 to 3.) Because of this, the print layer of the recording material can be provided with a particular excellent glossy appearance and a particular excellent abrasion resistance.

In the recording material of the present invention, the ultraviolet-curable composition for inkjet preferably includes the metal powder that is treated by the surface preparation with the fluorinated phosphate ester having a chemical formula shown in formula (2) below.

$$POR_n(OH)_{3-n} \tag{2}$$

(In formula (2), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n represents an integer between 1 to 3, m represents an integer between 2 to 18, and l represents an integer between 1 to 18. Because of this, the print layer of the recording material can be provided with a particular excellent glossy appearance and a particular excellent durability.

In the recording material of the present invention, it is preferable that the surface preparation agent has a perfluoroalkyl structure. Because of this, the print layer of the recording material can be provided with excellent glossy appearance and excellent durability. In the recording material of the present invention, in addition to the polymerized compound and the metal powder, the ultraviolet-curable composition for inkjet includes a dispersant having a polymeric structure in a basic. Because of this, the print layer of the recording material can be provided with excellent glossy appearance and excellent durability.

In the recording material of the present invention, the ultraviolet-curable composition for inkjet preferably includes phenoxyethyl acrylate as a polymerized compound. Because of this, the print layer of the recording material can be provided with excellent glossy appearance and excellent durability. In the recording material of the present invention, in addition to the phenoxyethyl acrylate as described above, as a polymerized compound, the ultraviolet-curable composition for inkjet preferably includes at least one selected from a group comprising 2-(2-vinyloxyethoxy) ethyl acrylate, dipropylene glycol diacrylate, tripropylene glycol diacrylate, 2-hydroxy-3-phenoxypropyle acrylate, and 4-hydroxybutyl acrylate. Because of this, the recording material can be provided with excellent glossy appearance and excellent durability.

In the recording material of the present invention, as a polymerized compound, the ultraviolet-curable composition for inkjet preferably includes at least one selected from a group comprising dimethylol tricyclodecane diacrylate, dimethylol dicyclopentane diacrylate, dicyclopentenyl acrylate, dicyclopentanyl acrylate, isobornyl acrylate, acryloylmorpholine, tetrahydrofurfuryl acrylate, cyclohexyl acrylate, isobutyl acrylate, t-butyl acrylate, benzyl acrylate, ethylcarbitol acrylate, and methoxy triethylene glycol acrylate. Because of this, the recording material can be provided with excellent glossy appearance and excellent durability.

BRIEF DESCRIPTION OF THE DRAWINGS

FIG. 1 shows a cross-section view of a recording material in a preferred embodiment of the present invention.

DETAILED DESCRIPTION OF EXEMPLARY EMBODIMENTS

Hereinafter, the detail about the preferred embodiments of the present invention will be explained by reference to the attached drawing.

Recording Material

FIG. 1 shows a cross-section view of a recording material in a preferred embodiment of the present invention. As shown in FIG. 1, a recording material 10 includes a recording medium 1 and a print layer 2 formed on the recording medium 1.

The print layer 2 is formed by using an ultraviolet-curable composition for inkjet including a polymerized compound and a glittering powder, and it has a configuration that the glittering powder is dispersed in a hardened part 2 that constitutes a material including a hardened material of the polymerized compound. And, the thickness of the print layer 2 is T (μm). When an area of thickness 0.5 T (μm) from the outer surface of the print layer 2 in the print layer 2 is the first area 21, and an area of thickness 0.5 T (μm) from the contact surface contacting the recording medium 1 in the print layer 2 is the second area 22, a ratio of the glittering powder 23 included in the first area 21 of the print layer 2 is more than 70 percent by volume and less than 95 percent by volume and a ratio of the glittering powder 23 included in the second area 22 of the print layer 2 is more than 5 percent by volume and less than 30 percent by volume. By this configuration, in the first area 21, a layer including the hardened material of the polymerized compound is thickly formed on the glittering powder 23 so that in view of the appearance of the recording medium 10, it can be properly prevented from the occurrence of the problem such that the glossy appearance of the material constituting the glittering powder 23 is not sufficiently demonstrated. As a result, the print layer 2 can be provided with excellent glossy appearance. Also, in the second area 22, by including the glittering powder 23 in a predetermined ratio, an effect as a filler can be demonstrated and this effect is combined with an effect of the polymerized compound in the ultraviolet-curable composition for inkjet so that it can be provided with a particular excellent adhesiveness to the recording medium 1 of the print layer 2 and a particular excellent durability of the recording material 10. That is, in accordance with the recording material of the present invention, both excellent glossy appearance and excellent durability can be achieved (for example, abrasion resistance, film strength of print layer, adhesiveness to the recording material of the print layer when a temperature change occurred).

On the other hand, when the ratios of the glittering powder included in the first area and the second area were out of range, the above described excellent effects were not obtained. That is, when the ratio of the glittering powder included in the first area was less than the lower limit value, the recording material cannot be sufficiently provided with the glossy appearance. Also, when the ratio of the glittering powder included in the first area was more than the higher limit value, the content rate of the glittering powder in the second area became relatively low so that the excellent durability of the recording material (for example, abrasion resistance, film strength of print layer, adhesiveness to the recording material of the print layer when a temperature change occurred) cannot be sufficiently provided. Also, when the ratio of the glittering powder included in the second area was less than the lower limit value, the excellent durability of the recording material (for example, abrasion resistance, film strength of print layer, adhesiveness to the recording material of the print layer when a temperature change occurred) cannot be sufficiently provided. Also, when the ratio of the glittering powder included in the second area was more than the higher limit value, the content rate of the glittering powder in the first area became relatively low so that the recording material cannot be sufficiently provided with excellent glossy appearance. By the way, the ratio of the glittering powder 23 included in the first area 21 of the print layer 2 and the ratio of the glittering powder 23 included in the second area 22 of the print layer 2 can be obtained by observing the cross-section by using an electron scanning microscope after the recording material 10 was cut by the FIB (focused ion beam).

As discussed above, a ratio of the glittering powder 23 included in the first area 21 of the print layer 2 can be more than 70 percent by volume and less than 95 percent by volume, but it is preferably more than 80 percent by volume and less than 93 percent by volume, and more preferably more than 85 percent by volume and less than 90 percent by volume. Because of this, the above described effects can be significantly demonstrated. Also, a ratio of the glittering powder 23 included in the second area 22 of the print layer 2 can be more than 5 percent by volume and less than 30 percent by volume, but it is preferably more than 7 percent by volume and less than 20 percent by volume, and more preferably more than 10 percent by volume and less than 15 percent by volume. Because of this, the above described effects can be significantly demonstrated.

The thickness of the print layer 2 is preferably more than 0.5 μm and less than 50 μm, and more preferably more than 2.0 μm and less than 15 μm. Because of this, the recording material 10 can be provided with a particular excellent glossy appearance and a particular excellent durability. The content of the glittering powder in the print layer 2 is preferably more than 0.1 percent by volume and less than 5.0 percent by volume, and more preferably more than 0.3 percent by volume and less than 3.0 percent by volume. Because of this, the recording material 10 can be provided with a particular excellent glossy appearance and a particular excellent durability.

The recording material of the present invention can be used for any purpose, and for example, it can be used for a decoration product or other purpose. As concrete examples of the present invention, it can be interior decorations for vehicles such as a console lid, a switch-base, a center cluster, an interior panel, an emblem, a center console, an indicator face plate, or the like. Also, it can be indicators such as a control part (type of key switch) of various electric devices, a decorative part demonstrating decorative characteristics, a guidepost, a logo, or the like.

The ultraviolet-curable composition used for forming the print layer 2 includes the polymerized compound, and also, the glittering powder 23 having an effect as a filler is included in the second area 22 in a predetermined ratio so that the print layer 2 provides excellent adhesiveness to the recording medium 1. Therefore, the recording medium 1 can be any material, but it is preferable to constitute a non-absorbed material (does not have an ink receive layer). Because of this, it is more properly to form the print layer 2 that satisfies the above described conditions. For example, for the recording medium 1, a plastic material, a metal, a ceramic, a wood material, shells, or the like can be used.

Next, the detail about the ultraviolet-curable composition for inkjet used for forming the print layer 2 will be explained.

Ultraviolet-Curable Composition for Inkjet

The ultraviolet-curable composition for inkjet used for forming the print layer 2 is discharged by the inkjet method and includes the glittering powder and the polymerized compound that is polymerized by irradiating ultraviolet light.

Glittering Powder

As discussed above, the recording material 10 of the present invention used for the ultraviolet-curable composition for inkjet includes the glittering powder 23. The glittering powder 23 could be anything if it has glossy appearance in itself. As a material constituting the glittering powder 23, for example, it can be a metal as a single element or various metal materials such as various alloys, various metallic oxide such as silica or oxidized titanium, various complex compositions such as a resin or a metallic oxide as a base coated by deposition from vapor phase or plating, or the like. Also, the glittering powder 23 could be mother particles constituting a material having the glossy appearance and the mother particles are treated by the surface preparation with the surface preparation agent. Because of this, while securing excellent glossy appearance, it can be provided with excellent dispersing stability of the glittering powder 23 in the ultraviolet-curable composition for inkjet, and it can be provided with excellent storage stability and excellent discharge stability of the ultraviolet-curable composition for inkjet.

Specifically, as the glittering powder 23, it is preferable that the mother particles constituting A1 on at least vicinity surface and the mother particles (metal powder) are treated by the surface preparation with the fluorinated silane compound and/or the fluorinated phosphate ester as a surface preparation agent. Among various materials, A1 originally has a particular excellent glossy appearance, but the present inventors discovered the occurrence of specific problems that when the powder constituting A1 was used for the ultraviolet-curable composition for inkjet, the dispersing stability became low in the ultraviolet-curable composition for inkjet, and the glossy appearance in the recording material produced by using the ultraviolet-curable composition for inkjet was weak compare to the original glossy appearance in the constituent material (A1) of the glittering powder. On the other hand, even when the mother powder constituting A1 on the surface was used, the above described occurrence of the problems can be properly prevented when the glittering powder (metal powder) was treated by the fluorinated silane compound and/or the fluorinated phosphate ester as a surface preparation agent. That is, the above described effects in the glittering powder constituting the ultraviolet-curable composition for inkjet can be specifically demonstrated by treating the powder (mother powder) constituting mainly A1 on at least surface with the surface preparation using the fluorinated silane compound and/or fluorinated phosphate ester. Therefore, the excellent glossy appearance of the recording material, and excellent storage stability and excellent discharge stability of the ultraviolet-curable composition for inkjet can be respectively secured at the high level.

Also, the mother particles could be produced by any methods, but when it constitutes A1, it is preferable to obtain the particles in a way that a film constituting A1 was formed by a vapor deposition method and after that, the film was crushed. Because of this, in the print layer 2, the glossy appearance which is originally included in A1 can be more effectively demonstrated. Also, variability of the characteristics between the respective particles can be suppressed. Also, by using the method, it can be properly produced even when the glittering powder 23 is comparatively thin.

When the mother particles are produced by using this type of method, for example, by performing the formation of film (film formation) constituted with A1 on the base material, the mother particles can be produced appropriately. As a base material, for example, a plastic film such as polyethylene terephthalate or the like can be used. Also, the base material can be included a parting agent layer on the surface of the film formation. Also, it is preferable that the crushing film is performed in a liquid by giving supersonic vibration to the film. By this process, while the mother particles having the above described grain diameter can be easily and securely obtained, the generation of the various sizes, shapes, and characteristics within the particles can be suppressed.

Also, in the above described method, when performing the crushing film, as liquid, alcohol compounds such as methanol, ethanol, propanol, butanol, carbon hydride compounds such as n-heptane, n-octane, decane, dodecane, tetra-decane, toluene, xylene, cymene, durene, indene, dipentene, tetrahydronaphthalene, decahydronaphthalene, cyclohexylebenzene, ether compounds such as ethyl glycol dimethyl ether, ethylene glycol diethyl ether, ethylene glycol methylethyl ether, di ethylene glycol dimethyl ether, diethylene glycol diethyl ether, diethylene glycol methylethyl ether, diethylene glycol monobutyl ether acetate, diethylene glycol n-butyl ether, tripropylene glycol dimethyl ether, triethylene glycol ethyl ether, 1,2-dimethoxyethane, bis(2-methoxyethyl)ether, p-dioxane, and polar compounds such as propylene carbonate, γ-butyrolactone, N-methyl-2-pyrolidone, N,N-dimethyl formamide (DMF), N,N-dimethyl acetamide (DMA), dimethyl sulfoxide, cyclohexanone, acetonitrile can be used appropriately. By using this type of the liquid, it prevents the unexpected oxidation of the mother particles, and the excellent productivity of the mother particles and the glittering powder 23 can be provided. Also, the possibility of generating various sizes, shapes, and characteristics within the particles can be small. As described above, the glittering powder 23 can be specifically treated by the surface preparation with the fluorinated silane compound and/or the fluorinated phosphate ester as a surface preparation agent.

The detail about the fluorinated silane compound in the surface preparation agent will be explained below. A silane compound having at least one fluorine atom in the molecule can be used as the fluorinated silane compound. Specifically, it is preferred that the fluorinated silane compound as the surface preparation agent has a chemical formula shown in formula (1) below.

$$R^1 SiX^1_a R^2_{(3-a)} \quad (1)$$

(In formula (1), $R^1$ represents a hydrocarbon group in which a part or all of hydrogen atoms is substituted by fluorine atom, $X^1$ represents hydrolysis group, ether group, chloro group or hydroxyl group, $R^2$ represents alkyl group having a carbon number 1 to 4, and a represents an integer between 1 to 3.)

Because of this, the ultraviolet-curable composition for inkjet can be provided with excellent storage stability, and the print layer 2 produced by using the ultraviolet-curable composition for inkjet can be provided with excellent glossy appearance and excellent durability. As $R^1$ in formula (1), for example, it can be alkyl group, alkenyl group, aryl group, aralkyl group in which a part or all of hydrogen atoms are substituted by fluorine atom. In addition, at least a part of hydrogen atoms (hydrogen atoms which are not substituted by fluorine atom) included in the molecular configuration can be substituted by amino group, carboxyl group, hydroxyl group, thiol group or the like, and hetero atom or benzene of aromatic ring such as —O—, —S—, —NH—, —N= can intervene within a carbon chain. For example, the concrete examples of $R^1$ are that a part or all of hydrogen atoms are substituted by fluorine atoms in phenyl group, benzyl group, phenethyl group, hydroxyphenyl group, chlorophenyl group, aminophenyl group, naphthyl group, anthranil group, pyrenyl group, thienyl group, pyrrolyl group, cyclohexyl group, cyclohexenyl group, cyclopentyl group, cyclopentenyl group, pyridinyl group, methyl group, ethyl group, n-propyl group, isopropyl group, n-butyl group, isobutyl group, sec-butyl group, tert-butyl group, octadecyl group, n-octyl group, chloromethyl group, methoxyethyl group, hydroxyethyl group, aminoethyl group, cyano group, mercaptopropyl group, vinyl group, allyl group, acryloxyethyl group, methacryloxyethyl group, glycidoxypropyl group, or acetoxy group.

As a concrete example of the fluorinated silane compound shown in formula (1), it is preferable to include a compound having a configuration that a part or all of hydrogen atoms in a silane compound are substituted by fluorine atoms. The silane compounds are dimethyl dimethoxy silane, diethyl diethoxy silane, 1-propenyl methyl dichlorosilane, propyl dimethyl chlorosilane, propylmethyl dichlorosilane, propyl trichlorosilane, propyl triethoxysilane, propyl trimethoxysilane, styrylethyl trimethoxysilane, tetradecyl trichlorosilane, 3-thiocyanate propyl triethoxysilane, p-tolyl dimethylchlorosilane, p-tolyl methyl dichlorosilane, p-tolyl trichlorosilane, p-tolyl trimethoxysilane, p-tolyl triethoxysilane, di-n-propyl di-n-propoxysilane, diisopropyl di-iso-propoxysilane, di-n-butyl di-n-butyloxysilane, di-sec-butyl di-sec-butyloxysilane, di-t-butyl di-t-butyloxysilane, octadecyltrichlorosilane, octadecyl methyl diethoxy silane, octadecyl triethoxysilane, octadecyl trimethoxysilane, octadecyl dimethylchlorosilane, octadecyl methyl dichlorosilane, octadecyl methoxy dichlorosilane, 7-octenyl dimethylchlorosilane, 7-octenyl trichlorosilane, 7-octenyl trimethoxysilane, octyl methyl dichlorosilane, octyl dimethyl chlorosilane, octyl trichlorosilane, 10-undecenyl dimethylchlorosilane, undecyl trichlorosilane, vinyl dimethyl chlorosilane, methyl octadecyl dimethoxysilane, methyl dodecyl diethoxysilane, methyl octadecyl dimethoxysilane, methyl octadecyl diethoxy silane, n-octyl methyl dimethoxy silane, n-octyl methyl diethoxy silane, triancotil dimethylchlorosilane, triancotil trichlorosilane, methyl trimethoxysilane, methyl triethoxysilane, methyltri-n-propoxysilane, methyl iso-propoxysilane, methyl-n-butyloxysilane, methyltri-sec-butyloxysilane, methyltri-t-butyloxysilane, ethyl trimethoxysilane, ethyl triethoxysilane, ethyl tri-n-propoxysilane, ethyl isopropoxysilane, ethyl-n-butyloxysilane, ethyl tri-sec-butyloxysilane, ethyl tri-t-butyloxysilane, n-propyl trimethoxysilane, isobutyl trimethoxysilane, n-hexyl trimethoxy silane, hexadecyl trimethoxysilane, n-octyl trimethoxysilane, n-dodecyl trimethoxy silane, n-octadecyl trimethoxysilane, n-propyl triethoxysilane, isobutyl triethoxysilane, n-hexyl triethoxysilane, hexadecyl triethoxysilane, n-octyl triethoxysilane, n-dodecyl trimethoxysilane, n-octadecyl triethoxysilane, 2-[2-(trichlorosilyl)ethyl]pyridine, 4-[2-(trichlorosilyl)ethyl]pyridine, diphenyl dimethoxysilane, diphenyl diethoxysilane 1,3-(trichlorosilyl methyl) heptacosane, dibenzyl dimethoxysilane, dibenzyl diethoxy phenyl trimethoxysilane, phenyl methyl dimethoxy silane, phenyl dimethyl methoxysilane, phenyl dimethoxysilane, phenyl diethoxysilane, phenyl methyl diethoxysilane, phenyl dimethyl ethoxysilane, benzyl triethoxysilane, benzyl trimethoxysilane, benzyl methyl dimethoxy silane, benzyl dimethyl trimethoxysilane, benzyl dimethoxysilane, benzyl diethoxysilane, benzyl methyl diethoxysilane, benzyl dimethyethoxylsilane, benzyl triethoxysilane, dibenzyl dimethoxysilane, dibenzyl diethoxysilane, 3-acetoxypropyl trimethoxysilane, 3-acryloxypropyl trimethoxysilane, allyl trimethoxysilane, allyl triethoxysilane, 4-aminobutyl triethoxysilane (amino ethyl amino methyl) phenethyl trimethoxysilane, N-(2-aminoethyl)-3-aminopropylmethyl dimethoxysilane, N-(2-aminoethyl)-3-aminopropyl trimethoxysilane, 6-(aminohexyl aminopropyl)trimethoxysilane, p-aminophenyl trimethoxysilane, p-aminophenyl ethoxysilane, m-aminophenyl trimethoxysilane, m-aminophenyl triethoxysilane, 3-aminopropyl trimethoxysilane, 3-aminopropyl triethoxysilane, ω-aminoundecyl trimethoxysilane, amyl triethoxysilane, benzoxazocinepine dimethyl ester, 5-(bicyclo heptenyl)triethoxysilane, bis(2-hydroxyethyl)-3-aminopropyl triethoxysilane, 8-bromooctyl trimethoxysilane, bromophenyl trimethoxysilane, 3-bromopropyl trimethoxysilane, n-butyl trimethoxysilane, 2-chloromethyl triethoxysilane, chloromethyl methyl diethoxysilane, chloromethyl methyl diisopropoxysilane, p-(chloromethyl) phenyl trimethoxysilane, chloromethyl triethoxysilane, chlorophenyl triethoxysilane, 3-chloropropyl methyl dimethoxysilane, 3-chloropropyl triethoxysilane, 3-chloropropyl trimethoxysilane, 2-(4-chlorosulfonyl phenyl)ethyl trimethoxysilane, 2-cyanoethyl triethoxysilane, 2-cyanoethyl trimethoxysilane, cyanomethyl phenethyl triethoxysilane, 3-cyanopropyl triethoxysilane, 2-(3-cyclohexenyl)ethyl trimethoxysilane, 2-(3-cyclohexenyl)ethyl triethoxysilane, 3-cyclohexenyl trichlorosilane, 2-(3-cyclohexenyl) ethyl trichlorosilane, 2-(3-cyclohexenyl)ethyl dimethyl chlorosilane, 2-(3-cyclohexenyl)ethyl methyl dichlorosilane, cyclohexyl dimethylchlorosilane, cyclohexyl ethyl dimethoxysilane, cyclohexyl methyl dichlorosilane, cyclohexyl methyl dimethoxysilane, (cyclohexyl methyl) trichlorosilane, cyclohexyl trichlorosilane, cyclohexyl trimethoxysilane, cyclooctyl trichlorosilane, (4-cyclooctenyl) trichlorosilane, cyclopentyl trichlorosilane, cyclopentyl trimethoxysilane, 1,1-diethoxy-1-Silacyclopenta-3-ene, 3-(2,4-dinitrophenyl amino) propyl triethoxysilane, (dimethyl chlorosilyl)methyl-7,7-dimethyl amino lupinane, (cyclohexyl aminomethyl) methyl diethoxysilane, (3-cyclopenta dienylpropyl)triethoxysilane, N,N-diethyl-3-aminopropyl) trimethoxysilane, 2-(3,4-epoxycyclohexyl)ethyltrimethoxysilane, 2-(3,4-epoxycyclohexyl)ethyl triethoxysilane, (furfuryl oxymethyl)triethoxysilane, 2-hydroxy-4-(3-tri-ethoxy propoxy)diphenyl ketone, 3-(p-methoxyphenyl) propyl methyl dichlorosilane, 3-(p-methoxyphenyl) propyl trichlorosilane, p-(methylphenethyl) methyl dichlorosilane, p-(methylphenethyl)trichlorosilane, p-(methylphenethyl)dimethylchlorosilane, 3-morpholinopropyl trimethoxysilane, (3-glycidoxypropyl) methyldiethoxysilane, 3-glycidoxypropyl trimethoxysilane, 1,2,3,4,7,7-hexachloro-6-methyldiethoxysilyl-2-norbornene, 1,2,3,4,7,7-hexachloro-6-triethoxysilyl-2-norbornene, 3-iodine propyl trimethoxysilane, 3-isocyanate propyl triethoxysilane, (mercaptomethyl)methyldiethoxysilane, 3-mercaptopropyl methyldimethoxy silane, 3-mercaptopropyl dimethoxysilane, 3-mercaptopropyl triethoxysilane, 3-methacryloxypropyl methyldiethoxysilane, 3-methacryloxypropyl trimethoxysilane, methyl-{2-(3-trimethoxysilyl propylamino)ethylamino}-3-propionate, 7-octenyl trimethoxysilane, R—N-α-phenethyl-N-triethoxysilyl propyl urea, S—N-α-phenethyl-N'-triethoxysilyl propyl urea, phenethyl trimethoxysilane, phenethyl methyl dimethoxysilane, phenethyl dimethylsilane, phenethyl dimethoxysilane, phenethyl diethoxysilane, phenethyl methyl diethoxy silane, phenethyl dimethylethoxysilane, phenethyl triethoxysilane, (3-phenylpropyl)dimethylchlorosilane, (3-phenylpropyl)methyldichlorosilane, N-phenyl aminopropyl trimethoxysilane, N-(triethoxysilylpropyl) dansylamide, N-(3-triethoxysilylpropyl)-4,5-dihydroimidazole, 2-(triethoxysilylethyl)-5-(chloroacetoxy) bicycloheptane, (S)—N-triethoxysilylpropyl-O-menthocarbamate, 3-(triethoxysilylpropyl)-p-nitro-benzamide, 3-(triethoxysilyl) propyl succinate anhydride, N-[5-(trimethoxysilyl)-2-aza-1-oxo-pentyl]caprolactam, 2-(trimethoxysilylethyl)pyridine, N-(trimethoxysilylethyl) benzyl-N,N, N-trimethyl ammonium chloride, phenyl vinyl diethoxysilane, 3-thiocyanate propyltriethoxysilane, N-{3 acid (triethoxysilyl) propyl}phthalamide, 1-trimethoxysilyl-2-(chloromethyl) phenyl ethane, 2-(trimethoxysilyl)ethyl phenyl sulfonyl azide, β-trimethoxy silylethyl-2-pyridine, trimethoxysilylpropyl diethylene triamine, N-(3-trimethoxysilylpropyl) pyrrole, N-trimethoxysilylpropyl-N,N, N-tributyl ammonium bromide, N-trimethoxysilylpropyl-N, N,N-tributyl ammonium chloride, N-trimethoxysilylpropyl-N,N, N-trimethylammonium chloride, vinyl methyl diethoxysilane, vinyl triethoxysilane, vinyl trimethoxysilane, vinyl methyl dimethoxysilane, vinyl dimethyl methoxysilane, vinyl dimethyl ethoxysilane, vinyl methyl dichlorosilane, vinyl phenyl dichlorosilane, vinyl phenyl diethoxysilane, vinyl phenyl dimethylsilane, vinyl phenyl methyl chlorosilane, vinyl tri-phenoxysilane, vinyl tris-t-butoxysilane, adamantyl ethyl trichlorosilane, allyl phenyl trichlorosilane, (aminoethyl aminomethyl) phenethyl trimethoxysilane, 3-aminophenoxy dimethyl vinyl silane, phenyl trichlorosilane, phenyl dimethylchlorosilane, phenyl methyl dichlorosilane, benzyl trichloro silane, benzyl dimethyl chlorosilane, benzyl methyl dichlorosilane, phenethyl diisopropyl chlorosilane, phenethyl trichlorosilane, phenethyl dimethylchlorosilane, phenethyl methyldichlorosilane, 5-(bicyclo heptenyl)trichlorosilane 5-(bicyclo heptenyl)triethoxy silane, 2-(bicyclo heptyl)dimethylchlorosilane, 2-(bicyclo heptyl) trichlorosilane, 1,4-bis(trimethoxysilylethyl)benzene, bromophenyl trichlorosilane, 3-phenoxypropyl dimethylchlorosilane, 3-phenoxypropyl trichlorosilane, t-butyl phenyl chlorosilane, t-butyl phenyl methoxysilane, t-butyl phenyl dichlorosilane, p-(t-butyl) phenethyl dimethylchlorosilane, p-(t-butyl) phenethyl trichlorosilane, 1,3-(dichloromethyl silylmethyl) heptacosane, ((chloromethyl)phenylethyl)dimethylchlorosilane, ((chloromethyl)phenylethyl) methyl dichlorosilane, ((chloromethyl)phenylethyl)trichlorosilane, ((chloromethyl)phenylethyl)trimethoxysilane, chlorophenyl trichlorosilane, 2-cyanoethyl trichlorosilane, 2-cyanoethyl methyl dichlorosilane, 3-cyanopropyl methyldiethoxysilane, 3-cyanopropyl methyl dichlorosilane, 3-cyanopropyl methyl dichlorosilane, 3-cyanopropyl dimethylethoxysilane, 3-cyanopropyl methyl dichlorosilane, 3-cyanopropyl trichlorosilane, or the like.

It is preferable that the fluorinated silane compound (surface preparation agent) has a perfluoroalkyl structure ($C_nF_{2n+1}$). Because of this, the ultraviolet-curable compound for ink-jet can be provided with excellent storage stability, and the print layer 2 of the recording material 10 can be excellent glossy appearance and excellent durability. As a fluorinated silane compound having a perfluoroalkyl structure ($C_nF_{2n+1}$), for example, it can be shown in formula (3) below.

$$C_nF_{2n+1}(CH_2)_mSiX^1{}_aR^2{}_{(3-a)} \qquad (3)$$

(In formula (3), $X^1$ represents hydrolysis group, ether group, chloro group or hydroxyl group, $R^2$ represents alkyl group having a carbon number 1 to 4, n represents an integer between 1 to 14, m represents an integer between 2 to 6, and a represents an integer between 1 to 3.)

The concrete examples of the compound having such a structure are $CF_3$—$CH_2CH_2$—$Si(OCH_3)_3$, $CF_3(CF_2)_3$—$CH_2CH_2$—$Si(OCH_3)_3$, $CF_3(CF_2)_5$—$CH_2CH_2$—$Si(OCH_3)_3$, $CF_3(CF_2)_5$—$CH_2CH_2$—$Si(OC_2H_5)_3$, $CF_3(CF_2)_7$—$CH_2CH_2$—$Si(OCH_3)_3$, $CF_3(CF_2)_{11}$—$CH_2CH_2$—$Si(OC_2H_5)_3$, $CF_3(CF_2)_3$—$CH_2CH_2$—$Si(CH_3)(OCH_3)_2$, $CF_3(CF_2)_7$—$CH_2CH_2$—$Si(CH_3)(OCH_3)_2$, $CF_3(CF_2)_8$—$CH_2CH_2$—$Si(CH_3)(OC_2H_5)_2$, $CF_3(CF_2)_8$—$CH_2CH_2$—$Si(C_2H_5)(OC_2H_5)_2$, or the like.

Also, as a fluorinated silane composition, it is also possible to use a perfluoroether structure ($C_nF_{2n+1}O$) instead of perfluoroalkyl structure ($C_nF_{2n+1}$). As a fluorinated silane composition having a perfluoroether structure ($C_nF_{2n+1}O$), for example, it can be shown in formula (4) below.

$$C_pF_{2p+1}O(C_pF_{2p}O)_r(CH_2)_mSiX^1{}_aR^2{}_{(3-a)} \qquad (4)$$

(In formula (4), $X^1$ represents hydrolysis group, ether group, chloro group or hydroxyl group, $R^2$ represents alkyl group having a carbon number 1 to 4, p represents an integer between 1 to 4, r represents an integer less than 10, m represents an integer between 2 to 6, and a represents an integer between 1 to 3.)

The concrete examples of the composition having such a structure are $CF_3O(CF_2O)_6$—$CH_2CH_2$—$Si(OC_2H_5)_3$, $CF_3O(C3F6O)_4$—$CH_2CH_2$—$Si(OCH_3)_3$, $CF_3O(C3F6O)_2(CF_2O)_3$—$CH_2CH_2$—$Si(OCH_3)_3$, $CF_3O(C3F6O)_8$—$CH_2CH_2$—$Si(OCH_3)_3$, $CF_3O(C4F9O)_5$—$CH_2CH_2$—$Si(OCH_3)_3$, $CF_3O(C4F9O)_5$—$CH_2CH_2$—$Si(CH_3)(OC_2H_5)_2$, $CF_3O(C3F6O)_4$—$CH_2CH_2$—$Si(C_2H_5)(OCH_3)_2$.

Next, among the surface preparation agents, the detail about the fluorinated phosphate ester will be explained. As a fluorinated phosphate ester, a phosphate ester having at least one fluorine atom within a molecule can be used. Specifically, it is preferable that the fluorinated phosphate ester as the surface preparation agent has a chemical formula shown in formula (2) below.

$$POR_n(OH)_{3-n} \qquad (2)$$

(In formula (2), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n represents an integer between 1 to 3, m represents an integer between 2 to 18, and l represents an integer between 1 to 18.)

Because of this, the ultraviolet-curable composition for inkjet can be provided with a particular excellent storage stability, and a print layer 10 of the recording material 10 can be provided with a particular excellent glossy appearance and a particular excellent durability. In formula (2), it is preferable that m is an integer between 3 to 14, but an integer between 4 to 12 is more preferable. Thus, the above described effect can be more sufficiently demonstrated. In addition, in formula (2), it is preferable that l is an integer between 1 to 14, but an integer between 1 to 10 is more preferable. Because of this, the above described effect can be more sufficiently demonstrated. Also, it is preferable that the fluorinated phosphate ester (surface preparation agent) has ($C_nF_{2n+1}$). Because of this, the ultraviolet-curable composition for inkjet can be provided with excellent storage stability, and a print layer 2 of the recording material 10 can be provided with excellent glossy appearance and excellent durability.

The above surface preparation agent (fluorinated silane composition, fluorinated phosphate ester) can directly treat the mother particles, but it is preferable that after treating acid or base, the mother particles are treated by the surface preparation agent (fluorinated silane composition, fluorinated phosphate ester). Because of this, a modification provided by a chemical bonding to the surface of the mother particles treated by the surface preparation agent (fluorinated silane composition, fluorinated phosphate ester) can be securely performed so that the above described effect can be more effectively demonstrated. As an acid, for example, it can be proton acid of hydrochloric acid, sulfuric acid, phosphoric acid, nitric acid, acetic acid, carbonic acid, formic acid, benzoic acid, chlorous acid, hypochlorous acid, sulfurous acid, hyposulfurous acid, nitrous acid, hyponitrous acid, phosphorous acid, and hypophosphorous acid, or the like. Among them, hydrochloric acid, phosphoric acid, and acetic acid can be preferable. On the other hand, as a base, for example, sodium hydrate, potassium hydrate, calcium hydrate, or the like can be used. Among them, sodium hydrate and potassium hydrate can be preferable.

The shape of the glittering powder 23 can be spherical shape, spindle shape, needle-shape, or the like, but scale like-shape can be preferable. Because of this, on the recording medium that the ultraviolet-curable composition for inkjet is used, a main surface of the glittering powder 23 can be properly arranged along a surface shape of the recording medium so that the material constituting the glittering powder 23, which is originally provided with glossy appearance or the like, can be effectively demonstrated in the recording material 10. Also, the print layer 2 can be provided with a particular excellent glossy appearance and a particular excellent high-class appearance, and the recording material 10 can be provided with a particular excellent durability.

In the present invention, the scale-like shape is defined that an area as viewed from a predetermined angle (as viewed in a planar view) is bigger shape than an area as viewed in a direction perpendicular to an observation direction such as a plated-form or a curved plated-form. Specifically, a ratio between an area $S_1$ ($\mu m^2$) as viewed in a direction observed from where a profile area becomes maximum and an area $S_0$ ($\mu m^2$) as viewed in a direction observed from where an area as viewed in a direction perpendicular to an observation direction becomes maximum is preferably more than 2, and more preferably more than 5, and further preferably more than 8. For example, this value can be obtained by performing the observation for any 10 particles and averaging the calculated values for these particles.

The average thickness of the glittering powder 23 is more than 10 nm and less than 100 nm, the average grain diameter of the glittering powder 23 is more than 500 nm and less than 3.0 μm, and the maximum grain diameter of the glittering powder 23 is less than 5 μm. Because of this, the recording material 10 can be provided with excellent glossy appearance and excellent high-class appearance. Also, the ultraviolet-curable composition for inkjet can be provided with excellent storage stability and excellent discharge stability.

As described above, the average thickness of the glittering powder 23 is preferably more than 10 nm and less than 100 nm, but it is more preferably more than 20 nm and less than 60 nm. Because of this, the above described effect can be more efficiently demonstrated. Also, the average grain diameter of the glittering powder 23 can be more than 500 nm and less than 3.0 μm, but it is more preferably more than 750 nm and less than 2.0 μm. Because of this, the above described effect can be more efficiently demonstrated. Also, the maximum grain diameter of the glittering powder 23 can be loss than 5 μm, but it is more preferably less than 3.5 μm. Because of this, the above described effect can be more efficiently demonstrated.

As described above, the content rate of the glittering powder 23 in the ultraviolet-curable composition for inkjet is preferably more than 0.5 mass % and less than 10.0 mass %, and more preferably more than 1.0 mass % and less than 5.0 mass %. By the way, the ultraviolet-curable composition for inkjet can include more than 2 types of the powder as the glittering powder 23. For example, the ultraviolet-curable composition for inkjet can include the plural types of surface prepared powder that are different from each other, or it can include the plural types of powder having the contents of the mother particles that are different from each other. Because of this, the ratio of the glittering powder 23 included in the first area 21 in the print layer 2, and the ratio of the glittering powder 23 included in the second area 22 in the print layer 2 can be easily included in the above described ranges. In this case, the sum of these content rates is preferably in the range of the value.

Polymerized Compound

A polymerized compound has properties such that it can be polymerized by irradiating ultraviolet and can be hardened. By including these types of properties, the recording material 10 can be provided with excellent durability (excellent abrasion resistance, excellent water resistance, excellent solvent resistance, or the like). The polymerized compound is liquid form so that in the ultraviolet-curable composition for inkjet, it is preferable to be functional as a dispersant to disperse the glittering powder 23. Because of this, it is not necessary to separately use a dispersant which is removed (vaporized) in the production process of the recording material. Since the dispersant removal process is unnecessary in the production of the recording material, the excellent productivity of the recording material can be provided. Also, since it is not necessary to use the organic solvent that is used in general as a dispersant, an occurrence of the VOC (volatile organic compound) problem can be prevented. Also, by containing the polymerized compound, the print layer 2 can be provided with excellent adhesiveness to various recording mediums 1 (base material). That is, by containing the polymerized compound, the ultraviolet-curable composition for inkjet becomes excellent media responsiveness.

As a polymerized compound, if it has a component that can be polymerized by irradiating ultraviolet, for example, various types of monomer, various types of oligomer (including dimer, trimer, or the like), or the like can be used. However, the ultraviolet-curable composition for inkjet preferably contains at least a monomer component as a polymerized compound. Monomer generally has a low viscosity compare to oligomer component, or the like so that the ultraviolet-curable composition for inkjet has an advantage of excellent discharge stability.

The monomers as a polymerized compound are, for example, isobornyl acrylate, 4-hydroxybutyl acrylate, lauryl acrylate, 2-methoxyethyl acrylate, phenoxyethyl acrylate, isooctyl acrylate, stearyl acrylate, cyclohexyl acrylate, 2-ethoxyethyl acrylate, benzyl acrylate, 1H, 1H, 5H-octafluoropentyl acrylate, 1H, 1H, 5H-octafluoropentyl methacrylate, 2-hydroxyethyl acrylate, 2-hydroxypropyl acrylate, isobutyl acrylate, t-butyl acrylate, tetrahydrofurfuryl acrylate, ethyl carbitol acrylate, 2,2,2-trifluoroethyl acrylate, 2,2, 2-trifluoroethyl methacrylate, 2,2,3,3-tetrafluoro-propyl acrylate, methoxy triethylene glycol acrylate, methoxy triethylene glycol acrylate, PO-modified nonylphenol acrylate, EO-modified nonylphenol acrylate, EO-modified 2-ethylhexyl acrylate, EO-modified nonylphenol acrylate, phenyl glycidyl ether acrylate, phenoxydiethylene glycol acrylate, EO-modified phenol acrylate, phenoxy ethyl acrylate, EO-modified phenol acrylate, EO-modified cresol acrylate, methoxy polyethylene glycol acrylate, dipropylene glycol acrylate, dicyclopentenyl acrylate, dicyclopentenyloxyethyl acrylate, 2-n-butyl-2-ethyl-1,3-propanediol diacrylate, tripropylene glycol diacrylate, tetra ethylene glycol diacrylate, 1.9-nonane diol diacrylate, 1,4-butanediol diacrylate, bisphenol A EO-modified diacrylate, 1.6-hexanediol diacrylate, polyethylene glycol 200 diacrylate, polyethylene glycol 300 diacrylate, neopentyl glycol hydroxypivalate diacrylate, 2-ethyl-2-butyl-propanediol diacrylate, polyethylene glycol 400 diacrylate, polyethylene glycol 600 diacrylate, polypropylene glycol diacrylate, 1.9-nonanediol diacrylate, 1.6-hexanediol diacrylate, bisphenol A EO-modified diacrylate, PO-modified bisphenol A diacrylate, EO-modified hydrogenated bisphenol A dipropylene, dipropylene glycol diacrylate, polypropylene glycol diacrylate, trimethylolpropane triacrylate, pentaerythritol triacrylate, trimethylolpropane EO-modified triacrylate, glycerin PO-added triacrylate, trisacryloyloxyethyl phosphate, pentaerythritol tetraacrylate, PO-modified trimethylolpropane triacrylate, PO-modified trimethylolpropane triacrylate, tris(acryloxyethyl) isocyanurate, pentaerythritol triacrylate, trimethylolpropane triacrylate, pentaerythritol triacrylate, acrylic acid 2-(2-vinyloxyethoxy)ethyl, 1-adamantyl methyl acrylate, 1-adamantyl acrylate, 2-acryloyloxyethyl phthalate, isobornyl acrylate, 3-acryloyloxyethyl propyl acrylate, acryloyl morpholine, lipoxy SP series, dicyclopentanyl acrylate, 2-hydroxy 3-phenoxypropyl acrylate, w-carboxy acryloyloxyethyl phthalate, dimethylol dicyclopentane diacrylate, diacrylate isosialate/triacrylate mixture, neopentyl glycol diacrylate, ditrimethylolpropane tetraacrylate, dipentaerythritol penta/hexa-acrylate, dipentaerythritol hexa acrylate, trimethylolpropane PO-modified triacrylate, diethylene glycol diethyl ether, or the like. Among them, 4-hydroxybutyl acrylate, phenoxy ethyl acrylate, phenoxy ethyl acrylate, dicyclopentenyl acrylate, dicyclopentenyloxyethyl acrylate, triethylene glycol diacrylate, tetraethylene glycol diacrylate, dipropylene glycol diacrylate, trimethylpropane triacrylate, trimethylolpropane EO-modified triacrylate, pentaerythritol tetraacrylate, pentaerythritol triacrylate, and acrylic acid 2-(2-vinyloxyethoxy) ethyl are preferable.

Specifically, the ultraviolet-curable composition for inkjet preferably includes phenoxyethyl acrylate as a polymerized compound. Because of this, the recording material 10 can be provided with a particular excellent glossy appearance and a particular excellent durability. Also, the ultraviolet-curable composition for inkjet can be provided with excellent storage stability and excellent discharge stability, and the ultraviolet-curable composition for inkjet after discharging by the inkjet method has a particular excellent reactive character so that it can provide a particular excellent productivity of the recording material.

Also, as a polymerized compound, in addition to phenoxyethyl acrylate, the ultraviolet-curable composition preferably includes at least one selected from a group comprising acrylic acid 2-(2-vinyloxyethoxy)ethyl, dipropylen glycol diacrylate, tripropylen glycol acrylate, 2-hydroxy 3-phenoxypropyl acrylate, and 4-hydroxybutyl acrylate. Because of this, the recording material 10 can be provided with excellent glossy appearance and excellent durability. Also, the ultraviolet-curable composition for inkjet can be provided with excellent storage stability and excellent discharge stability, and the ultraviolet-curable composition for inkjet after discharging by the inkjet method has a particular excellent reactive character so that it can provide a particular excellent productivity of the recording material, a particular excellent abrasion resistance of the formed pattern, or the like.

Also, as a polymerized compound, the ultraviolet-curable composition for inkjet preferably includes dimethylol tricyclodecane diacrylate, dimethylol dicyclopentane diacrylate, dicyclopentenyl acrylate, dicyclopentanyl acrylate, isobornyl acrylate, acryloylmorpholine, tetrahydrofurfuryl acrylate, cyclohexyl acrylate, isobutyl acrylate, t-butyl acrylate, benzyl acrylate, ethylcarbitol acrylate, and methoxy triethylene glycol acrylate. Because of this, the recording material 10 can be provided with excellent glossy appearance and excellent durability. Also, the ultraviolet-curable composition for inkjet can be provided with excellent storage stability and excellent discharge stability.

Also, as a polymerized compound, the ultraviolet-curable composition for inkjet can include oligomer besides monomer. Specifically, it is preferable to include multifunctional oligomer. Because of this, while providing the ultraviolet-curable composition for inkjet with excellent storage stability, the recording material 10 can be provided with a particular excellent durability or the like. By the way, in the present invention, the inside of the polymerized compound also has a repeated structure in a scaffold molecule, and if the molecular weight is more than 600, it calls oligomer. If the repeated structure is urethane, it is urethane oligomer. If the repeated structure is epoxy, it is epoxy oligomer. They are preferably used as oligomer.

A content rate of the polymerized composition in the ultraviolet-curable composition for inkjet is preferably more than 70 mass % and less than 99 mass %, and more preferably, more than 80 mass % and less than 98 mass %. Because of this, the ultraviolet-curable composition for inkjet can be provided with excellent storage stability, excellent discharge stability, excellent hardenability, and the recording material 10 can be provided with excellent glossy appearance and excellent durability. By the way, the ultraviolet-curable composition for inkjet can include more than 2 types of compositions as a polymerized compound. In this case, the sum of the content rates of these compounds is preferably in a range of the above values.

Dispersant

In addition to the above described glittering powder 23, the ultraviolet-curable composition for inkjet preferably includes the polymeric structure in a basic (hereinafter referred to as "basic high molecular dispersant"). Because of this, the recording material 10 can be provided with excellent glossy appearance and excellent durability. Also, the ultraviolet-curable composition for inkjet can be provided with a particular excellent storage stability.

By the way, in the present invention, the basic high molecular dispersant can be anything having a polymeric structure which includes a basic and it is not limited to the particular molecular weight. The polymeric structure constituting the basic high molecular dispersant is not particularly limited, but, for example, acrylic polymeric structure (including copolymer), methacrylic polymeric structure (including copolymer), polymeric structure of polyurethane series, hydroxyl group-containing carboxylic acid ester structure, polymeric structure of polyether series, polymeric structure of silicone series, or the like can be used.

The amine number of the basic high molecular dispersant is not particularly limited, but more than 3 mg KOH/g and less than 80 mg KOH/g is preferable, and more than 10 mg KOH/g and less than 70 mg KOH/g is more preferable. As the concrete examples of the basic high molecular dispersant, DISPERBYK-116 (made by BYK Chemie Company), DISPERBYK-182 (mad by BYK Chemie Company), DISPERBYK-183 (made by BYK Chemie Company), DISPERBYK-184 (made by BYK Chemie Company), DISPERBYK-2155 (made by BYK Chemie Company), DISPERBYK-2164 (made by BYK Chemie Company), DISPERBYK-108 (made by BYK Chemie Company), DISPERBYK-112 (made by BYK Chemie Company), DISPERBYK-198 (made by BYK Chemie Company), DISPERBYK-2150 (made by BYK Chemie Company), PAA-1112 (made by Nittobo Co., Ltd.) can be used.

A content rate of the basic high molecular dispersant in the ultraviolet-curable composition for inkjet is preferably more than 0.01 mass % and less than 5.0 mass %, and more preferably, more than 0.1 mass % and less than 2.0 mass %. Because of this, the ultraviolet-curable composition for inkjet can be provided with excellent storage stability, excellent discharge stability, excellent hardenability, and the recording material 10 can be provided with excellent glossy appearance and excellent durability. By the way, the ultraviolet-curable composition for inkjet can include more than 2 types of compositions as a basic high molecular dispersant. In this case, the sum of the content rates of these compounds is preferably in a range of the above values.

Composition A

Also, in the ultraviolet-curable composition for inkjet in the present invention, it is preferable to include a composition A having a partial structure shown in formula (5) below.

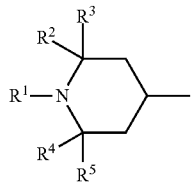

(5)

(In formula (5), $R^1$ represents hydrogen atom, hydrocarbon group, or alkoxy group, and $R^2$, $R^3$, $R^4$, and $R^5$ respectively and independently represent hydrogen atoms or hydrocarbon group).

By containing the composition A having such a chemical formula mixed with the glittering powder 23 treated by the above described surface preparation and the basic high molecular dispersant in the ultraviolet-curable composition for inkjet, the ultraviolet-curable composition for inkjet can be provided with a particular excellent storage stability and a particular excellent hardenability. Also, in the recording material produced by using the ultraviolet-curable composition for inkjet, the glossy appearance/high-class appearance, which is originally included as a characteristic of a material constituting the glittering powder 23, is effectively demonstrated so that it can provide a particular excellent glossy appearance and a particular excellent durability of the print layer 2 and it can provide a particular excellent durability of the recording material 10.

In formula (5), $R^1$ represents hydrogen atom, hydrocarbon group, or alkoxy group (this is a chain or alicyclic hydrocarbon group bonded to oxygen atom), but specifically, hydrogen atom, methyl group, or octyloxy group are preferable. Because of this, the ultraviolet-curable composition for inkjet can be provided with excellent storage stability and excellent discharge stability, and the print layer 2 can be provided with excellent glossy appearance and excellent durability.

Also, in formula (5), $R^2$ to $R^5$ could respectively and independently represent hydrogen atom or hydrocarbon group, but alkyl group of a carbon number 1 to 3 is preferable and methyl group is more preferable. Because of this, the ultraviolet-curable composition for inkjet can be provided with excellent storage stability and excellent discharge stability, and a print layer 2 can be provided with excellent glossy appearance and excellent durability.

A content rate of the composition A in the ultraviolet-curable composition for inkjet is preferably more than 0.1 mass % and less than 5.0 mass %, and more preferably, more than 0.5 mass % and less than 3.0 mass %. Because of this, the ultraviolet-curable composition for inkjet can be provided with excellent storage stability, excellent discharge stability, and excellent hardenability, and the recording material 10 is provided with excellent glossy appearance and excellent durability. By the way, the ultraviolet-curable composition for inkjet can include more than 2 types of compositions as a composition A. In this case, the sum of the content rates of these compounds is preferably in a range of the above values.

When the content rate of the composition A is $X_A$ (mass %) and the content rate of the glittering powder 23 is $X_M$ (mass %), it is preferable to satisfy a relationship of $0.01 \leq X_A/X_M \leq 0.8$, and a relationship of $0.05 \leq X_A/X_M \leq 0.4$ is more preferable. By satisfying these relationships, the ultraviolet-curable composition for inkjet can be provided with excellent storage stability and excellent discharge stability, and the print layer 2 can be provided with excellent glossy appearance and excellent durability.

Other Components

The ultraviolet-curable composition for inkjet used for forming the print layer 2 can include components (other components) besides the components discussed above. As these components, for example, it can be a photopolymerization initiator, slip agents (leveling agent), dispersants other than the basic high molecular dispersant, a polymerization accelerator, a polymerization inhibitor, penetration enhancers, wetting agents (humectants), coloring agents, fixing agents, antifungal agents, preservatives, antioxidants, chelating agents, thickeners, sensitizer (sensitizing dye), or the like.

As a photopolymerization initiator, it is not particularly limited if it can generate active species of radical, cation, or the like by irradiating ultraviolet light and it can start the polymerization reaction of the polymerized compound. As a photopolymerization initiator, a photo-radical polymerization initiator or a photo-cation polymerization initiator can be used, but the photo-radical polymerization initiator is preferably used. When the photopolymerization initiator is used, it is preferable that the photopolymerization initiator has an absorption peak in the ultraviolet range.

As a photo-radical polymerization initiator, for example, it can be aromatic ketones, acyl phosphine oxide compound, aromatic onium salt compound, organic peroxides, thio compound (thioxanthone compound, and thiophenyl group-containing compound), hexaarylbiimidazole compound, ketoxime ester compound, borate compound, azinium compound, metallocene compound, active ester compound, compound having carbon-halogen bond, alkylamine compound, or the like. Among them, in view of resolvability and hardenability to the polymerized compound, at least one selected from acyl phosphine oxide compound and thioxanthone compound is preferable and it is more preferable to combine acyl phosphine oxide compound and thioxanthone compound.

The concrete examples of the photo-radical polymerization initiator are acetophenone, acetophenone benzyl ketal, 1-hydroxy cyclohexyl phenyl ketone, 2,2-dimethoxy-2-phenylacetophenone, xanthone, fluorenone, benzaldehyde, fluorene, anthraquinone, triphenylamine, carbazole, 3-methylaceto phenone, 4-chlorobenzophenone, 4,4'-dimethoxybenzophenone, 4,4'-diamino benzophenone, Michler's ketone, benzoin propyl ether, benzoin ethyl ether, benzyl dimethyl ketal, 1-(4-isopropyl-phenyl)-2-hydroxy-2-methylpropane-1-one, 2-hydroxy-2-methyl-1-phenylpropan-1-one, thioxanthone, diethyl thioxanthone, 2-isopropylthioxanthone, 2-chlorothioxanthone, 2-methyl-1-[4-(methylthio)phenyl]-2-morpholino-propan-1-one, bis(2,4,6-trimethyl benzoyl)-phenyl phosphine oxide, 2,4,6-trimethylbenzoyl-diphenyl-phosphine oxide, 2,4-diethyloxan, (2,6-dimethyl-benzoyl)-2,4,4-trimethylpentyl phosphine oxide, or the like. Among them, one or more than two compounds are selected and the combination of these compounds can be used.

The content rate of the photopolymerization initiator in the ultraviolet-curable composition for inkjet is preferably more than 0.5 mass % and less than 10 mass %. In the range of the content rate of the photopolymerization initiator, ultraviolet curing speed is sufficiently large and in addition, the remains of melted photopolymerization initiator or the coloration caused by the photopolymerization initiator do not occur. When the ultraviolet-curable composition for inkjet includes a slip agent, by leveling function, the surface of the recording material 10 becomes smoother surface so that the durability is improved.

As a slip agent, it is not particularly limited, but for example, silicone surfactants of polyester modified-silicone, polyether modified-silicone, or the like can be used and it is preferable to use polyester modified-polydimethylsiloxane or polyether modified-polydimethylsiloxane. By the way, the ultraviolet-curable composition for inkjet can include a polymerization inhibitor. However, even when the polymerization inhibitor is included, the content rate of the polymerization inhibitor in the ultraviolet-curable composition for inkjet is preferably less than 0.6 mass % and more preferably less than 0.2 mass %. Because of this, since the content of the polymerized compound in the ultraviolet-curable composition for inkjet is relatively high, the print layer 2 can be provided with a particular excellent durability.

Also, it is preferable that the ultraviolet-curable composition for inkjet does not include organic solvent that is removed (vaporized) in the production process of the recording material. Because of this, an occurrence of the VOC (volatile organic compound) problem can be effectively prevented. The viscosity of the ultraviolet-curable composition for inkjet in the present invention at room temperature (20° C.) is preferably less than 20 mPa·s and more preferably more than 3 mPa and less than 15 mPa. Because of this, the ink droplet by the inkjet method can be properly performed.

As a droplet discharge method (inkjet method), a piezo method, a method that discharges ink from bubble generated by heating ink, or the like can be used, but from the viewpoint of the prevention of a property change in the ultraviolet-curable composition for inkjet, the piezo method is preferable. A publicly known droplet discharge device can be used for performing the discharge of the ultraviolet-curable composition for inkjet by using the inkjet method.

The ultraviolet-curable composition for inkjet discharged by the inkjet method can be hardened by irradiating the ultraviolet light. As a source of the ultraviolet light, for example, a mercury lamp, a metal halide lamp, an ultraviolet light emitting diode (UV-LED), an ultraviolet laser diode (UV-LD), or the like can be used. Among them, from the viewpoint of compact size, long life, high efficiency, and low cost, the ultraviolet light emitting diode (UV-LED) and the ultraviolet laser diode (UV-LD) are preferable.

Hereinbefore, the present invention was explained based on the preferred embodiments, but the present invention is not limited to these embodiments. For example, in the above described embodiments, it was mainly explained that the mother particles were used as the glittering powder when the metal powder was treated by the surface preparation with the fluorinated silane compound and/or the fluorinated phosphate ester, but it is possible that the glittering powder does not have to be treated by the surface preparation. Also, the mother particles in the glittering powder can be treated by the surface preparation with the surface preparation agent other than the fluorinated silane compound and the fluorinated phosphate ester.

EXAMPLES

Next, the concrete examples of the present invention will be explained.

(1) Production of Ultraviolet-Curable Composition for Inkjet

Preparation Example 1

First of all, a film made by polyethylene terephthalate, which has a smooth surface, (surface roughness Ra is less than 0.02 μm) was prepared.

Next, silicone oil entirely applies to one side of the film surface. Next, a film constituting A1 is formed on the surface, that the silicone oil was applied, by the evaporation method. Further, the film made by polyethylene terephthalate (base material), which was constituted by the A1 film, is soaked into the liquid constituted by diethylene glycol diethylester and the supersonic vibration is applied to it. Because of this, the powder made by A1 that has scale-like shape (particles that should become mother particles) was obtained.

Next, the above obtained A1 particles are put in 1 mass % propanol solution of $CF_3(CF_2)_4(CH_2)_2O\text{—}PO(OH)_2$ as a fluorinated phosphate ester and by stirring it for 10 seconds, the surface preparation was performed by the fluorinated phosphate ester so that the glittering powder (metal powder) was obtained. The average grain diameter of the obtained glittering powder is 0.8 μm, and the average thickness is 60 nm.

Next, by mixing the glittering powder with DISPERBYK-183 (made by BYK Chemie Company) as a dispersant (basic high molecular dispersant) having a basic polymerization structure, phenoxyethyl acrylate, Irgacure 819 (made by Chiba. Japan Company) as a photopolymerization initiator, Speedcure TPO (made by ACETO Company) as a photopolymerization initiator, Speedcure DETX (made by Lambson Company) as a photopolymerization initiator, and composition A having a chemical formula shown in formula (6) below, the ultraviolet-curable composition for inkjet was obtained.

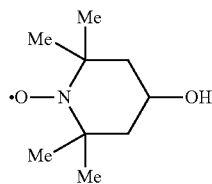

(6)

Preparation Examples 2 to 11

The constitution of the glittering powder is shown in table 1 and table 2. The ultraviolet-curable compositions for inkjet in these examples were produced in the same manner as the above described preparation example 1 except the compositions to be shown in table 1 and table 2 by changing the types of raw materials and ratios used for the adjustment of the ultraviolet-curable composition for inkjet.

Preparation Examples 12 to 17

The constitution of the glittering powder is shown in table 2. The ultraviolet-curable compositions for inkjet in these examples were produced in the same manner as the above described preparation example 1 except the compositions to be as shown in table 2 by changing the types of raw materials and ratios used for the adjustment of the ultraviolet-curable composition for inkjet.

Regarding the above described respective preparation examples, as a whole, the components of the ultraviolet-curable compositions for inkjet are shown in table 1 and table 2. In the tables, "S1" represents $CF_3(CF_2)_4(CH_2)_2O\text{—}PO(OH)_2$, "S2" represents $CF_3(CF_2)_5\text{—}CH_2CH_2\text{—}Si(OC_2H_5)_3$, "S3" represents $CF_3\text{—}CH_2CH_2\text{—}Si(OCH_3)_3$, "S4" represents $CF_3(CF_2)_7\text{—}CH_2CH_2\text{—}Si(OCH_3)_3$, "S5" represents $CF_3(CF_2)_5(CH_2)_2O\text{—}PO(OH)(OC_2H_5)$, "S6" represents $CF_3(CF_2)_5\text{—}CH_2CH_2\text{—}Si(OCH_3)_3$, "S'1" represents $NH_3\text{—}(CH_2)_3\text{—}Si(OCH_3)_3$, "D1" represents DISPERBYK-183 (made by BYK Chemie Company, amine number: 17 mg KOH/g), "D2" represents DISPERBYK-182 (made by BYK Chemie Company, amine number: 13 mg KOH/g), "D3" represents DISPERBYK-184 (made by BYK Chemie Company, amine number: 15 mg KOH/g), "D4" represents DISPERBYK-116 (made by BYK Chemie Company, amine number 65 mg KOH/g), "D5" represents DISPERBYK-2155 (made by BYK Chemie Company, amine number: 48 mg HOK/g), "D6" represents DISPERBYK-2164 (made by BYK Chemie Company, amine number 14 mg KOH/g), "D7" represents PAA-1112 (made by Nittobo Company), "D'1" represents EMANON 4110 (made by Kao Corporation), "D'2" represents NONION P-208 (made by Nichiyu Company), "PES" represents phnoxyethyl acrylate, "TPGDA" represents tripropylene glycol diacrylate, "DPGDA" represents dipropylene glycol diacrylate, "HPPA" represents 1-hydroxy 3-phenoxypropyl acrylate, "VC" represents N-vinyl caprolactam, "DMTCDDA" represents dimethylol tricyclodecane acrylate, "DMDCPTA" represents dimethylol dicyclopentane diacrylate, "DCPTeA" represents dicyclopentenyl acrylate, "DCPTaA" represents dicyclopentanyl acrylate, "IBA" represents isobornyl acrylate, "AM" represents acryloylmorpholine, "THFA" represents "tetrahydrofurfuryl acrylate", "ECA" represents ethylcarbitol acrylate, "MTEGA" represents methoxytriethylene glycol acrylate, "CHA" represents cyclohexyl acrylate, "TBA" represents t-butyl acrylate, "BA" represents benzyl acrylate, "VEEA" represents acrylate 2-(2-hydroxyethoxy)ethyl, "HBA" represents 4-hydroxybutyl acrylate, "BM" represents benzyl methacrylate, "UA" represents urethane acrylate, "HAD" represents 1,6-hexandiol diacrylate, "A1" represents a compound (composition A) shown in the above described formula (6), "A2" represents a compound (composition A) shown in the above described formula (7), "A3" represents a compound (composition A) shown in the above described formula (8), "A4" represents a compound (composition A) shown in the above described formula (9), "ic819" represents Irgacure 819 (made by Chiba. Japan Company), "scTPO" represents Speedcure TPO (made by ACETO Company), "scDETX" represents Speedcure DETX (made by Lambson Company), "UV3500" represents UV-3500 (made BKY Chemi Company), and "MEHQ" represents hydroquinone monomethyl ether. Regarding preparation example 9 in the tables, the components of the constituent materials of the mother particles are shown in a ratio by weight for a content rate of each element. Also, by performing the observation of any 10 glittering powder (particles) included in each ultraviolet-curable composition for inkjet, the ratios $(S_1/S_0)$ between an area $S_1$ (μm$^2$) (as viewed in a planer view) as viewed in a direction observed from where a profile area becomes maximum and an area $S_0$ (μm$^2$) as viewed in a direction observed from where an area as viewed in a direction perpendicular to an observation direction becomes maximum are calculated, and as a result, the $S_1/S_0$ value in preparation examples 1 to 11, 12, and 14-17 were more than 8, respectively. Also, the $S_1/S_0$ value in preparation example 13 was 1. In addition, by using vibration type viscometer, the viscosity of the ultraviolet-curable compositions for inkjet in preparation examples 1 to 11 measured in reference with J1S Z8809 at 20° was in a range between 3 mPa·s and 15 mPa·s. By the way, D1 to D7 respectively have a polymeric structure in a basic (basic high molecular dispersant).

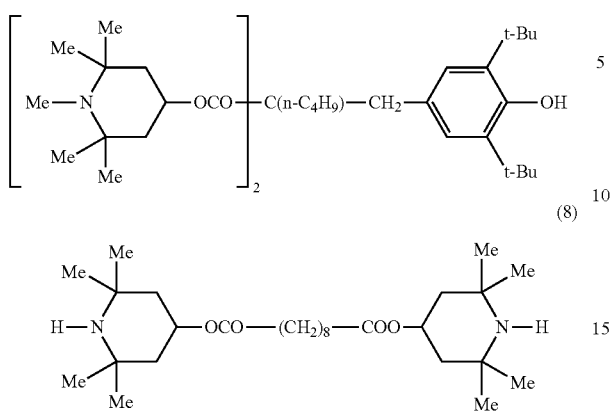

(However, the composition A shown in formula (9) is a mixture of a plurality of compositions (main component is a composition that n in the formula is between 15 to 18).)

TABLE 1

| | Constitution of Glittering Powder | | Contents of Content of Ultraviolet-curable Composition for Inkjet Composition | | | | | | | | |
|---|---|---|---|---|---|---|---|---|---|---|---|
| | | | Glittering Powder (Metal Powder) | | | | Dispersant | | Composition A | |
| | Constituent Material of Mother Particles | Materials Used for Surface Preparation | Shape | Average Grain Diameter (μm) | Average thickness (μm) | Maximum diameter (μm) | Content Rate (Mass Part) | | Content Rate (Mass Part) | | Content Rate (Mass Part) |
| Prep. Example 1 | A1 | S1 | Scale-like | 0.8 | 60 | 3.0 | 2.0 | D1 | 0.16 | A1 | 0.28 |
| Prep. Example 2 | A1 | S1 | Scale-like | 0.9 | 60 | 3.1 | 4.0 | D1 | 0.8 | A2 | 0.8 |
| Prep. Example 3 | A1 | S1 | Scale-like | 2.0 | 60 | 4.2 | 2.0 | D2 | 1.4 | A1 | 1.4 |
| Prep. Example 4 | A1 | S2 | Scale-like | 1.1 | 60 | 2.9 | 2.0 | D3 | 0.4 | A1 | 0.4 |
| Prep. Example 5 | A1 | S3 | Scale-like | 1.0 | 40 | 2.7 | 2.0 | D4 | 0.3 | A3 | 0.3 |
| Prep. Example 6 | A1 | S4 | Scale-like | 0.7 | 40 | 2.4 | 4.0 | D5 | 0.2 | A1 | 0.2 |
| Prep. Example 7 | A1 | S5 | Scale-like | 0.9 | 30 | 3.6 | 2.0 | D6 | 1.2 | A4 | 1.2 |
| Prep. Example 8 | A1 | S6 | Scale-like | 1.5 | 30 | 3.4 | 1.0 | D7 | 1.0 | A1 | 1.0 |

| | Contents of Content of Ultraviolet-curable Composition for Inkjet Composition | | | |
|---|---|---|---|---|
| | Polymerized Compound | | Other Components | |
| | | Content Rate (Mass Part) | | Content Rate (Mass Part) |
| Prep. Example 1 | PEA | 87.56 | ic819/scTPO/scDETX | 4.0/4.0/2.0 |
| Prep. Example 2 | PEA/TPGDA/DPGDA/VC/IBA/HPPA | 35.0/35.3/2.0/5.5/4.0/2.2 | ic819/scTPO/scDETX/UV3500/MEHQ | 4.0/4.0/2.0/0.2/0.2 |
| Prep. Example 3 | PEA/VEEA/TPGDA/DPGDA/DMTCDDA/AM | 35.8/32.1/2.0/5.5/4.0/5.6 | ic819/scTPO/scDETX/UV3500 | 4.0/4.0/2.0/0.2 |
| Prep. Example 4 | PEA/DCPTeA/DMDCPTA/IBA/HBA | 36.2/37.5/2.0/9.5/1.6 | ic819/scTPO/xcDETX/UV3500/MEHQ | 4.0/4.0/2.0/0.2/0.2 |
| Prep. Example 5 | PEA/VEEA/TPGDA/DPGDA/BM/BA/UA | 36.2/34.6/1.0/2.0/5.5/4.0/3.9 | ic819/scTPO/UV3500/MEHQ | 4.0/4.0/0.2/0.2 |
| Prep. Example 6 | PEA/VEEA/TBA | 46.8/32.2/10.0 | ic819/scTPO/UV3500/MEHQ | 4.0/4.0/0.2/0.2 |
| Prep. Example 7 | PEA/DCPTaA/THFA | 35.8/39.1/11.5 | ic819/scTPO/scDETX/UV3500/MEHQ | 4.0/4.0/2.0/0.2/0.2 |

TABLE 1-continued

| | | | | | |
|---|---|---|---|---|---|
| Prep. Example 8 | PEA/ECA/MTEGA/CHA/BM | 36.3/39.8/2.0/5.5/4.0 | ic819/scTPO/scDETX/UV3500/MEHQ | 4.0/4.0/2.0/0.2/0.2 | |

TABLE 2

| | Constitution of Glittering Powder | | Contents of Content of Ultraviolet-curable Composition for Inkjet Composition | | | | | | | |
|---|---|---|---|---|---|---|---|---|---|---|
| | | | Glittering Powder (Metal Powder) | | | | Dispersant | | Composition A | |
| | Constituent Material of Mother Particles | Materials Used for Surface Preparation | Shape | Average Grain Diameter (μm) | Average thickness (μm) | Maximum diameter (μm) | Content Rate (Mass Part) | | Content Rate (Mass Part) | | Content Rate (Mass Part) |
| Prep. Example 9 | Ni49.5Fe50.5 | S4 | Scale-like | 1.8 | 93 | 2.9 | 2.0 | D1 | 0.8 | A2 | 0.8 |
| Prep. Example 10 | SUS316L | S5 | Scale-like | 1.5 | 76 | 2.7 | 2.0 | D5 | 0.2 | A1 | 0.2 |
| Prep. Example 11 | A1 | S1 | Scale-like | 1.2 | 54 | 3.1 | 1.5 | D3 | 0.4 | A1 | 0.4 |
| | A1 | S2 | Scale-like | 1.2 | 45 | 2.4 | 1.5 | | | | |
| Prep. Example 12 | A1 | — | Scale-like | 0.8 | 60 | 3.0 | 2.0 | D1 | 0.16 | A1 | 0.28 |
| Prep. Example 13 | A1 | — | Spherical | 0.8 | 800 | 5.9 | 2.0 | D1 | 0.16 | A1 | 0.28 |
| Prep. Example 14 | A1 | S'1 | Scale-like | 0.8 | 60 | 3.0 | 2.0 | D1 | 0.16 | A1 | 0.28 |
| Prep. Example 15 | A1 | S1 | Scale-like | 0.8 | 60 | 3.0 | 2.0 | — | — | A1 | 0.28 |
| Prep. Example 16 | A1 | S1 | Scale-like | 0.8 | 60 | 3.0 | 2.0 | D'1 | 0.16 | A1 | 0.28 |
| Prep. Example 17 | A1 | S1 | Scale-like | 0.8 | 60 | 3.0 | 2.0 | D'2 | 0.16 | A1 | 0.28 |

| | | Contents of Content of Ultraviolet-curable Composition for Inkjet Composition | | | |
|---|---|---|---|---|---|
| | | Polymerized Compound | | Other Components | |
| | | | Content Rate (Mass Part) | | Content Rate (Mass Part) |
| | Prep. Example 9 | PEA/VEEA/TPGDA/DPGDA/AM | 36.2/36.7/2.0/9.5/1.6 | ic819/scTPO/scDETX/UV3500/MEHQ | 4.0/4.0/2.0/0.2/0.2 |
| | Prep. Example 10 | PEA/DCPTeA | 46.8/40.4 | ic819/scTPO/scDETX/UV3500/MEHQ | 4.0/4.0/2.0/0.2/0.2 |
| | Prep. Example 11 | PEA/DCPTeA/DA/DCPTA/HAD | 15.2/57.5/2.0/11.1 | ic819/scTPO/scDETX?UV3500/MEHQ | 4.0/4.0/2.0/0.2/0.2 |
| | Prep. Example 12 | PEA | 87.56 | ic819/scTPO/scDETX | 4.0/4.0/2.0 |
| | Prep. Example 13 | PEA | 87.56 | ic819/scTPO/scDETX | 4.0/4.0/2.0 |
| | Prep. Example 14 | PEA | 87.56 | ic819/scTPO/scDETX | 4.0/4.0/2.0 |
| | Prep. Example 15 | PEA | 87.72 | ic819/scTPO/scDETX | 4.0/4.0/2.0 |
| | Prep. Example 16 | PEA | 87.56 | ic819/scTPO/scDETX | 4.0/4.0/2.0 |
| | Prep. Example 17 | PEA | 87.56 | ic819/scTPO/scDETX | 4.0/4.0/2.0 |

(2) Production of a Recording Material

Example 1

By using the ultraviolet-curable composition for inkjet of preparation example 1, the recording material for an interior panel was provided as follows. First of all, the inkjet compositions were put in the inkjet apparatus.

After that, the ultraviolet-curable composition for inkjet was discharged in a predetermined pattern on a base material (recording medium) having a curving surface part that was formed by using polycarbonate (made by Asahi Glass Co., Ltd., CARBOGLASS PLISH 2 mm thickness). After that, the interior panels (ten) as a recording material were obtained by hardening the ultraviolet-curable composition for inkjet on the base material. The ultraviolet-curable composition for inkjet was hardened by irradiating ultraviolet light, which has a maximum value of spectrum at 365 nm, 380 nm, and 395 nm wavelengths, at 180 mW/cm² of the irradiation intensity for 15 seconds.

Also 10 interior panels (recording materials) were respectively provided in the above same manner besides using polyethylene terephthalate (made by Mitsubishi Plastic, Inc., DIAFOIL G440E 38 μm thickness) used to form as a base material, low-density polyethylene (made by Mitsui Chemicals Tohcell, Inc., T.U.S. (L-LDPE) HC-E #80) used to form as a base material, biaxially oriented polypropylene (made by Mitsui Chemicals Tohcell, Inc., OP U-1 #60) used to form as a base material, and hard vinyl chloride (made by Acrysunday Co., Ltd., SUNDAY SHEET (transparent) 0.5 mm thickness) used to form as a base material.

Examples 2 to 11

The interior panel was provided in the same manner as the above described example 1 except changing a type of the ultraviolet-curable compositions for inkjet, which is used for providing the recording material, prepared in the respective preparation examples 2 to 11.

Comparative Examples 1 to 6

The interior panel was provided in the same manner as the above described example 1 except changing a type of the ultraviolet-curable compositions for inkjet, which is used for providing the recording material, prepared in the respective preparation examples 12 to 17.

(3) Evaluation of Recording Material

The respective above obtained recording materials were evaluated as follows.

(3.1) Appearance Evaluation of Recording Materials

The recording materials of the respective examples and the comparative examples were visually evaluated in accordance with 7 stages standard below.
A: Extremely excellent appearance with a full of rich glossy appearance.
B: Excellent appearance with a full of rich glossy appearance.
C: Very good appearance with a rich glossy appearance.
D: Good appearance with a rich glossy appearance.
E: Slightly not-good appearance with an insufficient glossy appearance.
F: Not-good appearance with a weak glossy appearance.
G: Extremely not-good appearance with a weak glossy appearance.

(3.2) Degree of Glossiness

Regarding the print layer of the recording materials in the respective examples and comparative examples, by using the degree of glossiness (MINOLTA MULTI GLOSS 268), the degree of the glossiness measured in a flap angle 60° was evaluated in accordance with standards below.
A: Degree of glossiness more than 400.
B: Degree of glossiness more than 300 and less than 400.
C: Degree of glossiness more than 200 and less than 300.
D: Degree of glossiness less than 200.

(3.3) Abrasion Resistance

Regarding the recording materials of the respective examples and comparative examples, the abrasion resistance test using polyethylene terephthalate film (Mitsubishi Plastic, Inc., DIAFOILG440E) was performed by using Sutherland rub tester in reference with JIS K5701 when 48 hours elapsed from the production of the recording materials. In the same method as discussed above (3.2), the degree of glossiness (flap angle 60°) for the recording materials was measured after the abrasion resistance test, and a decreasing rate of the degree of glossiness after the abrasion resistance test was calculated for the evaluation in accordance with standards below.
A: A decreasing rate of the degree of glossiness is less than 5%.
B: A decreasing rate of the degree of glossiness is more than 5% and less than 13%.
C: A decreasing rate of the degree of glossiness is more than 13% and less than 23%.
D: A decreasing rate of the degree of glossiness is more than 23% and less than 27%.
E: A decreasing rate of the degree of glossiness is less than 27% or the surface of the recording medium is exposed because the metal particles were come off.

(3.4) Film Strength of Print Layer

Regarding the recording materials of the respective examples and the comparative examples, a cross-cut method was executed and the degree of glossiness measurement was performed for respective masses. And, a number of masses that the decreasing rate of the degree of glossiness was more than 5% due to the abrasion in the print layer were calculated and the evaluation was made in accordance with the following standards.
A: A number of masses confirmed that the decreasing rate of the degree of glossiness is less than 5% as a whole.
B: A number of masses confirmed that the decreasing rate of the degree of glossiness is more than 5% and less than 15% as a whole.
C: A number of masses confirmed that the decreasing rate of the degree of glossiness is more than 15% and less than 30% as a whole.
D: A number of masses confirmed that the decreasing rate of the degree of glossiness is more than 30% as a whole.

(3.5) Heat-Cycle Test

Regarding the recording materials of the respective examples and comparative examples, an existence or non-existence of the occurrence of abrasions or cracks was visually observed after performing 100 cycles of which an individual piece cut out in three centimeter square was alternately in the environment of 75° per hour and the environment of −10° per hour. 10 pieces were put in, respectively and the evaluations were made in accordance with the standards below.
A: An occurrence of abrasions or cracks is 0 pieces.
B: An occurrence of abrasions or cracks is 1 piece.
C: An occurrence of abrasions or cracks is more than 2 pieces.

These results are shown in table 3 with a ratio value X1 (percent by volume) of the glittering powder included in the first area of the print layer and a ratio value X2 (percent by volume) of the glittering powder included in the second area of the print layer. By the way, in table 3, M1 represents a recording material provided by using a base material of polycarbonate, M2 represents a recording material provided by using a base material of polyethylene terephthalate, M3 represents a recording material provided by using a base material of low density polyethylene, M4 represents a recording material provided by using a base material of biaxially oriented polypropylene, and M5 represents a recording material provided by using a base material of hard vinyl chloride. Also, the ratio of the glittering powder included in the first area of the print layer and the ratio of the glittering powder included in the second area of the print layer can be obtained by observing the cross-section by using an electron scanning microscope after the recording material was cut by the FIB (focused ion beam).

TABLE 3

| | Ultraviolet-curable Composition for Inkjet Used for Print Layer Formation | X1 (percentage by volume) | X2 (percentage by volume) | Appearance of Recording Material | | | | | Degree of Glossiness | | | | |
|---|---|---|---|---|---|---|---|---|---|---|---|---|---|
| | | | | M1 | M2 | M3 | M4 | M5 | M1 | M2 | M3 | M4 | M5 |
| Example 1 | Preparation Example 1 | 97 | 3 | A | A | A | A | A | A | A | A | A | A |
| Example 2 | Preparation Example 2 | 84 | 16 | A | A | A | A | A | A | A | A | A | A |
| Example 3 | Preparation Example 3 | 71 | 29 | A | A | A | A | A | B | B | B | B | B |
| Example 4 | Preparation Example 4 | 79 | 21 | A | A | A | A | A | B | B | B | B | B |
| Example 5 | Preparation Example 5 | 74 | 26 | A | A | A | A | A | A | A | A | A | A |
| Example 6 | Preparation Example 6 | 82 | 18 | A | A | A | A | A | A | A | A | A | A |
| Example 7 | Preparation Example 7 | 85 | 15 | A | A | A | A | A | A | A | A | A | A |
| Example 8 | Preparation Example 8 | 71 | 29 | A | A | A | A | A | B | B | B | B | B |
| Example 9 | Preparation Example 9 | 70 | 30 | A | A | A | A | A | B | B | B | B | B |
| Example 10 | Preparation Example 10 | 79 | 21 | A | A | A | A | A | B | B | B | B | B |
| Example 11 | Preparation Example 11 | 89 | 11 | A | A | A | A | A | A | A | A | A | A |
| Comparative Example 1 | Preparation Example 12 | 45 | 55 | F | F | F | F | F | C | C | C | C | C |
| Comparative Example 2 | Preparation Example 13 | 31 | 69 | G | G | G | G | G | D | D | D | D | D |
| Comparative Example 3 | Preparation Example 14 | 54 | 46 | E | E | E | E | E | C | C | C | C | C |
| Comparative Example 4 | Preparation Example 15 | 50 | 50 | E | E | E | E | E | C | C | C | C | C |
| Comparative Example 5 | Preparation Example 16 | 62 | 48 | E | E | E | E | E | B | B | B | B | B |
| Comparative Example 6 | Preparation Example 17 | 59 | 41 | E | E | E | E | E | B | B | B | B | B |

| | Abrasion Resistance | | | | | Film Strength of Print Layer | | | | | Heat-cycle Test | | | | |
|---|---|---|---|---|---|---|---|---|---|---|---|---|---|---|---|
| | M1 | M2 | M3 | M4 | M5 | M1 | M2 | M3 | M4 | M5 | M1 | M2 | M3 | M4 | M5 |
| Example 1 | A | A | A | A | A | A | A | A | A | A | A | A | A | A | A |
| Example 2 | A | A | A | A | A | A | B | B | B | A | A | B | B | A | A |
| Example 3 | A | A | A | A | A | A | A | A | A | A | A | A | A | A | A |
| Example 4 | A | A | A | A | A | A | B | A | A | A | A | A | A | A | A |
| Example 5 | A | A | A | A | A | A | A | A | A | A | B | A | A | A | A |
| Example 6 | A | A | A | A | A | A | B | B | B | A | A | B | B | A | A |
| Example 7 | A | A | A | A | A | A | B | B | B | A | A | B | A | A | A |
| Example 8 | B | B | B | B | B | A | A | A | A | B | B | B | B | B | B |
| Example 9 | A | A | A | A | A | A | B | A | A | A | A | A | A | A | A |
| Example 10 | A | A | A | A | A | B | B | B | B | A | A | B | B | A | A |
| Example 11 | A | A | A | A | A | A | A | A | A | A | A | A | A | A | A |
| Comparative Example 1 | C | C | C | C | C | C | C | C | C | C | B | C | C | C | C |
| Comparative Example 2 | C | C | C | C | C | C | D | D | D | C | B | C | C | C | B |
| Comparative Example 3 | C | C | C | C | C | C | D | D | D | C | B | C | C | C | C |
| Comparative Example 4 | C | C | C | C | C | C | D | D | D | C | B | C | C | C | C |
| Comparative Example 5 | B | B | B | B | B | C | D | D | D | C | B | B | B | B | B |
| Comparative Example 6 | B | B | B | B | B | C | D | D | D | C | B | B | B | B | B |

As is clear from table 3, the recording material of the present invention had excellent glossy appearance and excellent appearance, and it had excellent abrasion resistance of the print layer, excellent film strength of the print layer, and excellent stability for the temperature changes. Also, in examples 1 to 11, the ultraviolet-curable composition for inkjet used for forming the print layer had excellent discharge stability of droplet and excellent storage stability. On the other hand, the sufficient results were not obtained in the comparative examples. Also, the recording materials were provided in the same manner except changing the average thickness of the print layer in a range between 0.5 μm and 50 μm, and when the same evaluations as described above were made, the same results as described above were obtained.

The recording material of one embodiment of the invention is produced by using the ultraviolet-curable composition for inkjet including a polymerized compound and a glittering powder. The recording material comprises a recording medium and a print layer formed on the recording medium. The thickness of the print layer is T (μm). When an area that is thickness 0.5T (μm) from the outer surface in the print layer is the first area, and an area that is thickness 0.5T (μm) from the contact surface contacting the recording medium in the print layer is the second area, a ratio of the glittering powder included in the first area of the print layer is more than 70 percent by volume and less than 95 percent by volume and a ratio of the glittering powder included in the second area of the print layer is more than 5 percent by volume and less than 30 percent by volume. Because of this, a recording material having a pattern (print layer) can be provided with excellent glossy appearance and excellent durability.

According to one embodiment of the invention, the average thickness of the print layer is preferably more than 0.5 μm and less than 50 μm. Because of this, the recording material can be provided with a particular excellent glossy appearance and a particular excellent durability. In the recording material of the present invention, the content rate of the glittering powder in the print layer is preferably more than 0.1 percent by volume and less than 5.0 percent by volume. Because of this, the recording material can be provided with a particular excellent glossy appearance and a particular excellent durability.

What is claimed is:

1. A recording material comprising:
an ultraviolet-curable composition for inkjet that includes a polymerized compound and a glittering powder to produce the recording material;
a recording medium; and
a print layer formed on the recording medium, wherein
a content rate of the glittering powder in the print layer is more than 0.1 percent by volume and less than 5.0 percent by volume.

2. The recording material according to claim 1, wherein the glittering powder has a scale-like shape.

3. The recording material according to claim 2, wherein an average thickness of the glittering powder is more than 10 nm and less than 100 nm, an average grain diameter is more than 500 nm and less than 3.0 μm, and in addition, a maximum grain diameter is less than 5 μm.

4. The recording material according to claim 1, wherein an average thickness of the print layer is more than 0.5 μm and less than 50 μm.

5. The recording material according to claim 1, wherein a thickness of the print layer is T (μm), and when an area that is thickness 0.5T (μm) from an outer surface in the print layer is a first area and an area that is thickness 0.5T (μm) from a contact surface contacting the recording medium in the print layer is a second area,
a ratio of the glittering powder included in the first area of the print layer is more than 70 percent by volume and less than 95 percent by volume, and
a ratio of the glittering powder included in the second area of the print layer is more than 5 percent by volume and less than 30 percent by volume.

6. The recording material according to claim 1, wherein the ultraviolet-curable composition for inkjet in which mother particles constitute A1 on at least vicinity of a surface as the glittering powder includes metal particles treated by a surface preparation with a fluorinated silane compound and/or a fluorinated phosphate ester as a surface preparation agent.

7. The recording material according to claim 6, wherein the ultraviolet-curable composition for inkjet preferably includes the metal powder that is treated by the surface preparation with the fluorinated silane compound having a chemical formula shown in formula (1) as follows

$$R^1SiX^1{}_aR^2{}_{(3-a)} \qquad (1)$$

wherein, in formula (1), $R^1$ represents a hydrocarbon group in which a part or all of hydrogen atoms is substituted by fluorine atom, $X^1$ represents hydrolysis group, ether group, chloro group or hydroxyl group, $R^2$ represents alkyl group having a carbon number 1 to 4, and a represents an integer between 1 to 3.

8. The recording material according to claim 6, wherein the ultraviolet-curable composition for inkjet preferably includes the metal powder that is treated by the surface preparation with the fluorinated phosphate ester having a chemical formula shown in formula (2) as follows;

$$POR_n(OH)_{3-n} \qquad (2)$$

wherein, in formula (2), R represents $CF_3(CF_2)_m$—, $CF_3(CF_2)_m(CH_2)_l$—, $CF_3(CF_2)_m(CH_2O)_l$—, $CF_3(CF_2)_m(CH_2CH_2O)_l$—, $CF_3(CF_2)_mO$— or $CF_3(CF_2)_m(CH_2)_lO$—, n represents an integer between 1 to 3, m represents an integer between 2 to 18, and l represents an integer between 1 to 18.

9. The recording material according to claim 6, wherein the surface preparation agent has a perfluoroalkyl structure.

10. The recording material according to claim 6, wherein in addition to the polymerized compound and the metal powder, the ultraviolet-curable composition for inkjet includes a dispersant having a polymeric structure in a basic.

11. The recording material according to claim 1, wherein the ultraviolet-curable composition for inkjet includes phenoxyethyl acrylate as a polymerized compound.

12. The recording material according to claim 11, wherein in addition to the phenoxyethyl acrylate, as a polymerized compound, the ultraviolet-curable composition for inkjet includes at least one selected from a group comprising 2-(2-vinyloxyethoxy) ethyl acrylate, dipropylene glycol diacrylate, tripropylene glycol diacrylate, 2-hydroxy-3-phenoxypropyle acrylate, and 4-hydroxybutyl acrylate.

13. The recording material according to claim 1, wherein as a polymerized compound, the ultraviolet-curable composition for inkjet includes at least one selected from a group comprising dimethylol tricyclodecane diacrylate, dimethylol dicyclopentane diacrylate, dicyclopentenyl acrylate, dicyclopentanyl acrylate, isobornyl acrylate, acryloylmorpholine, tetrahydrofurfuryl acrylate, cyclohexyl acrylate, isobutyl acrylate, t-butyl acrylate, benzyl acrylate, ethylcarbitol acrylate, and methoxy triethylene glycol acrylate.

* * * * *